J. TOMODA.
SPEED CHANGING GEAR SYSTEM.
APPLICATION FILED MAR. 5, 1919.
1,343,944.
Patented June 22, 1920.
2 SHEETS—SHEET 2.
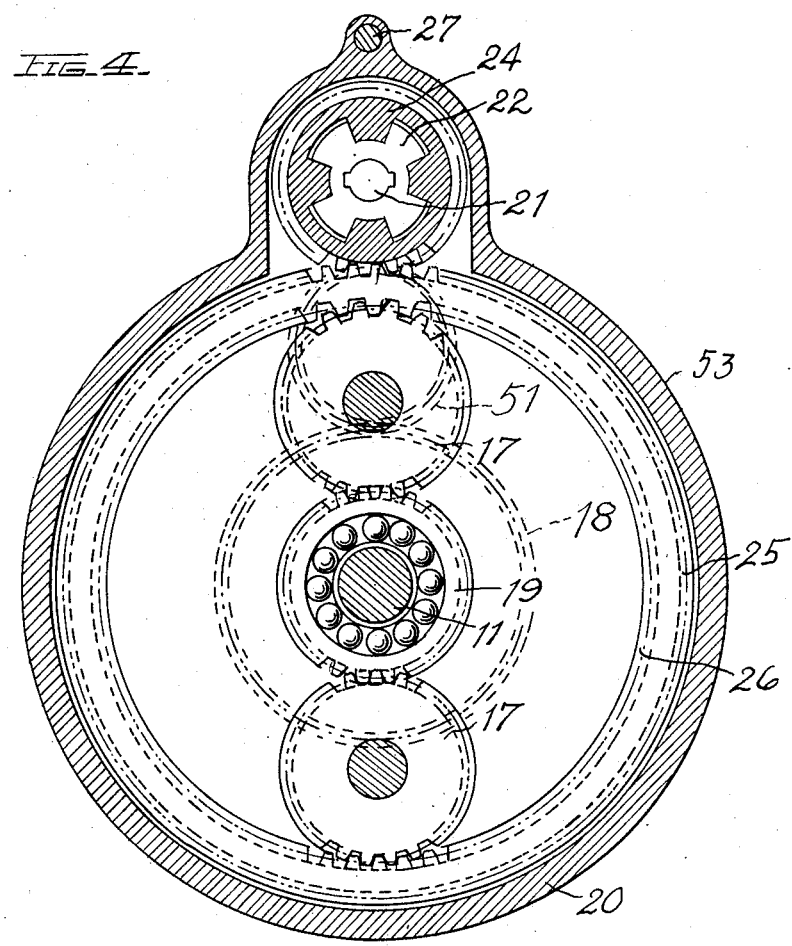
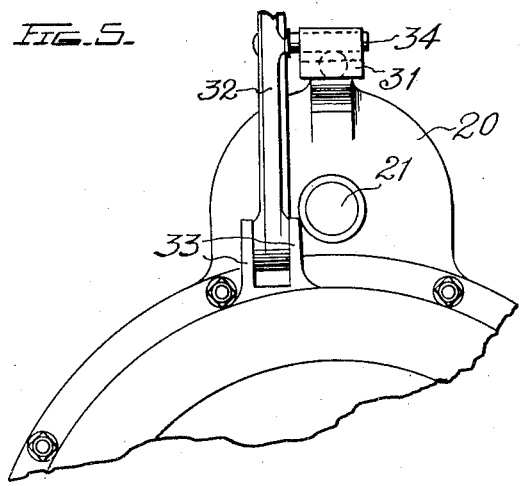
INVENTOR:
Jichio Tomoda.
By His Atty.
Edward A. Kajime

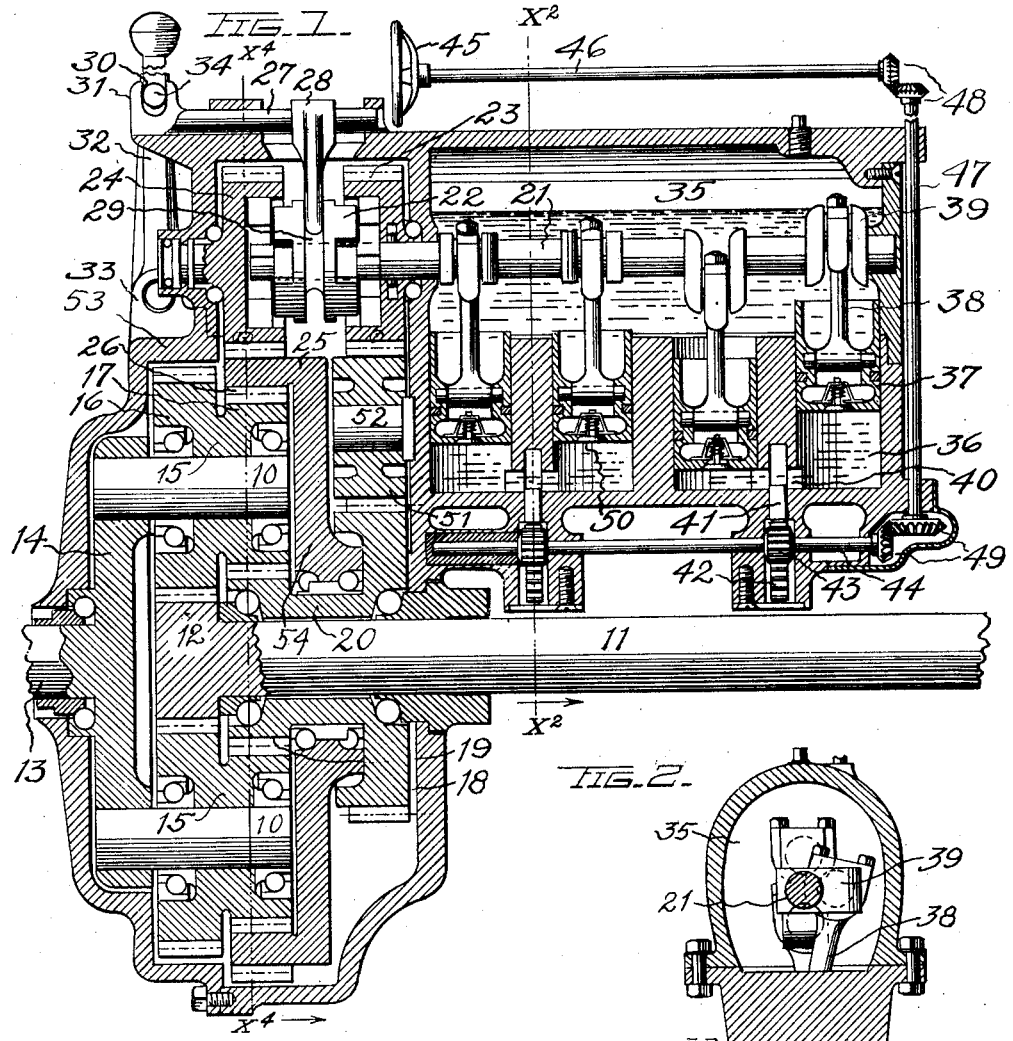
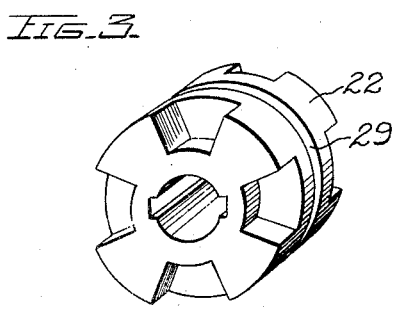

UNITED STATES PATENT OFFICE.

JICHIO TOMODA, OF HYNES, CALIFORNIA.

SPEED-CHANGING-GEAR SYSTEM.

1,343,944.  Specification of Letters Patent. Patented June 22, 1920.

Application filed March 5, 1919. Serial No. 280,744.

*To all whom it may concern:*

Be it known that I, JICHIO TOMODA, a subject of the Emperor of Japan, residing at Hynes, in the county of Los Angeles and State of California, have invented a new and useful Speed-Changing-Gear System, of which the following is a specification.

This invention relates to useful improvements in the gear systems of motor vehicles, and its primary object is to provide a simple and efficient means for effecting the reverse movement of the vehicle.

It is a design of the invention to embody features to prevent noise, shock, and jar to the vehicle upon changing speed, to prevent stripping of the gears, to reduce strain on the moving parts due to faulty handling of the shifting mechanism, and to otherwise simplify the control thereof.

To the end stated the invention consists in providing an improved planetary gearset, an improved clutch, and improved hydraulic braking means for retarding the gear and pinion elements, whereby the rotation of a constant speed motor may be converted into variable speeds and reverse for propulsion of the vehicle in all conditions of travel.

Upon the annexed drawings, Figure 1 is a vertical and sectional view of a gearset for motor vehicles, embodying the present invention. Fig. 2 is a fragmentary and sectional view on line $x^2$—$x^2$, of Fig. 1. Fig. 3 is a perspective view of the clutch member. Fig. 4 is a transverse and sectional view on line $x^4$—$x^4$, of Fig. 1. Fig. 5 is a fragmentary view showing the clutch operating lever.

Referring to the drawings, the gearset is intended to be mounted on the driving shaft 11, provided with an integral pinion 12, and the differential or driven shaft 13, provided with an integral disk 14 to which are affixed the pinion studs 10. The pinion members 15, consisting of integral pinions 16 and 17, are mounted on studs 10. Gear 18 and pinion 19, are formed integral with sleeve 20, which is independently rotatable on shaft 11. Pinion 12 is constantly in mesh with pinions 16. Pinion 19 is in constant mesh with pinions 17. Gear 18 is in constant mesh with an idler pinion 51 mounted on a fixed stud 52 projecting from the upper casing 53.

A shaft 21 is rotatably mounted in upper casing 53, and has mounted thereon, a clutch member 22, adapted to slide longitudinally to and fro and engage with clutch pinions 23 and 24, respectively, in mesh with idler pinion 51 and with gear 25, on the revoluble member 54. The internal gear 26, on member 54, is in mesh with pinions 17. For shifting clutch member 22, slide 27 is provided with a crosshead 28 in engagement with groove 29 in the periphery of clutch member 22. Slide 27 is formed with a head 31 provided with a slot 30. A lever 32, pivotally connected to lugs 33, on casing 53, is provided with a pin 34 in engagement with slot 30, and the slide member is operated by movement of lever 32, thereby shifting the clutch to operative and inoperative position.

Casing 53 contains an oil chamber 35 and integral cylinders 36, having therein the working pistons 37, connected by pitmen 38, to crank shaft 21. The cranks 39 are spaced ninety degrees apart. The cylinders are connected in pairs by intercommunicating ports 40. Valve members 41 are adapted to close said ports, closing the communication between the cylinders of a pair, the valve members being provided with integral rack gears 42, operated by pinions 43 on shaft 44, and controlled by hand-wheel 46, countershaft 47, and gears 48 and 49. Valves 50 open one way for transmission of oil from the chamber to the cylinders.

To obtain a high speed transmission, gear 19 is kept from revolving as hereinafter shown, and pinion 12 drives members 15, through the gears 16, but gears 17 cannot turn without running around stationary pinion 19, thus producing a rotary movement of disk 14 and shaft 13, contrary to the movement of shaft 11, the gear member 54 being free to revolve when pinion 19 is stationary. The gear ratios of pinions 12, 16, 17, and 19, are such, that effective speed of rotation is transmitted to differential shaft 13.

To obtain any desired low speed from the maximum of high speed to zero, the retarding influence which serves to hold pinion 19 stationary during the maximum high speed, is reduced.

To obtain a reverse rotation of the differential shaft 13, the gear member 54 is kept from revolving as hereinafter shown, extended ends of the arched end sill member 13, are bracket plates 16, shown in detail in Fig. 6, and riveted thereto, are curved plates 17, provided with a semi-circular channeled or grooved marginal portion 18, in which the inner ends of the tubular bracket arms 12, are seated and held confined beneath the body sills 15, of the car, thus rigidly supporting said bracket arms in position.

Riveted, brazed or secured in any suitable manner beneath the respective carrier members 1 and 2, is a bar 19, which extends upwardly at the rear of the carrier, and is provided with a hinged bar or plate 20, adapted to latch over a staple secured in the bar 19, to receive a pad-lock 21, locked thereover whereby a tire, denoted by the reference numeral 22, shown in Figs. 1 and 5, may be locked in place.

In the modified form of device illustrated in Fig. 8, in place of the two U-shaped bracing bars 6 and 7, shown in Figs. 1 to 5, inclusive, I have illustrated two U-bars 23 and 24, respectively, the ends of which do not overlap but are flanged outwardly and provided with connecting bolts 25, which may be drawn up, thereby contracting the carrier members 1 and 2, to reduce the diameter thereof.

The operation is as follows:

In the form of device illustrated in Figs. 1 to 5, inclusive, the bent tubular bracket arms 12, are attached at the rear end of the motor car beneath the body sills 15, thereof, as shown in Fig. 5, by plates 17, which are bolted around the rear end sill 13, by means of the bracket plates 16. Said tubular bracket arms 12, are thus rotatable against friction in the retaining plates 17, so that the distance between the centers at the outer ends of said bracket arms may be varied in order to facilitate attachment of the tire carrier thereto. Said tubular arms are clamped between the members 11, which are secured upon the bracket plates 10, which in turn support the two associated beaded semi-circular tire carrier members 1 and 2, in upright position. The respective U-bars 6 and 7, connected on the upper ends of said tire carrier members 1 and 2, serve to stiffen and brace the same and also provide a means for changing the diameter of the associated members 1 and 2, by forcibly expanding or contracting the same, this being performed by shifting the bolts 8, in the different holes provided therefor in the overlapping ends of said U-bars 6 and 7.

In the form of device illustrated in Fig. 8, in place of the U-bars 6 and 7, I have shown U-bars 23 and 24, which are connected by means of adjustable tension bolts 25, whereby the U-bars 23 and 24, may be drawn up to reduce the diameter of the carrier members 1 and 2.

It is obvious that the carrier is well adapted for use in carrying tires which may become deformed or changed in size after use. The resilient members 9, as shown in Figs. 1 to 4, inclusive, act automatically as a compensating means for holding a tire tightly in place and adapting the carrier without adjustment for use with tires of slightly different size, but a further adjustment is provided by shifting the bolts 8, and contracting or expanding the semi-circular members 1 and 2, if so desired. In any event, a tire, either new or old, when carried in this device, is securely held in position in the carrier. For instance, in the form of device as shown in Figs. 1 to 4, a new tire may be carried upon the inner semi-circular carrying member, held tightly therein by the resilient members 9, and a slightly enlarged used tire may be carried in the outer semi-circular carrier member 1, the U-bars 6—7, of course, having been adjusted for the purpose.

In an application filed by me October 30, 1917, Serial No. 199,232, which is a division of the present application, there have been embodied claims covering the broad idea of a curved carrier, and means for contracting and expanding said carrier to adapt it for tires of different sizes. This case, therefore, while disclosing this broad idea, is restricted to such details of construction as are not disclosed in said divisional application.

I am aware that various details of construction may be varied through a wide range without departing from the principles of this invention, and I therefore do not purpose limiting the patent granted otherwise than necessitated by the prior art.

I claim as my invention:

1. In a tire carrier of the class described, curved supporting means, mechanism for attaching the same to a motor car, means expanding and contracting said means to adapt the same for carrying tires of different size and resilient members on said supporting means adapted to contact and hold a tire therebetween.

2. In a tire carrier of the class described, curved carrier means adapted to receive a tire deposited therein, mechanisms for contracting and expanding said means and holding the same in a contracted or expanded position to retain a tire securely in place therein, and resilient plates secured to the curved carrier means extending upwardly to the top thereof adapted to yield to compensate for tires of varying sizes.

3. In a tire carrier of the class described, curved carrying means, adjustable mechanisms connecting the upper ends thereof whereby said means may be contracted and expanded and held in contracted and expanded positions, and resilient inwardly arched means secured on said carrying pinion on the driving shaft, a disk fixed to the driven shaft, pinion studs projecting from the disk, planetary pinions mounted on the pinion studs, said planetary pinions being in constant mesh with the driving shaft pinion, an independently rotative sleeve on the driving shaft, a pinion integral with said sleeve in constant mesh with the planetary pinions, an internal gear-wheel member rotatively mounted on said sleeve, in mesh with the planetary pinions and provided with an external gear, a gear wheel member integral with said sleeve and mounted on the opposite end thereof, a casing inclosing the gearset, a stud shaft projecting from the casing, a pinion mounted on the stud shaft and in constant mesh with the gear member forming the end of the rotary sleeve, a retarding shaft journaled in the casing and provided with cranks 90 degrees apart, clutch pinions independently rotative on the retarding shaft and in mesh, respectively, with the external gear portion of the internal gear wheel member, and with the idler pinion, a liquid tight casing integral with the gearset casing, pumping cylinders integral with the last-named casing, and connected in pairs with valve controlled ports, a liquid medium contained within the cylinders, pistons working in the cylinders, and serving to force the liquid to alternate cylinders, pitmen connecting the pistons with the retarding shaft, means for closing the ports between the cylinders, a sliding clutch member on the retarding shaft, and means for manually operating the sliding clutch member to engagement with the clutch pinions.

7. In an epicyclic gearset, a driving shaft, a fixed pinion thereon, a driven shaft, a disk fixed to the driven shaft, pinion studs fixed to the disk, loose pinions mounted on the pinion studs, said loose pinions being in constant mesh with the driving shaft pinion, gears integral with the loose pinions, a sleeve independently rotatable upon the driving shaft, a fixed gear on the sleeve in constant mesh with the fixed gear on the loose pinions, an internal gear member in constant mesh with the gear on the loose pinions, hydraulic means for retarding the movement of the sleeve gear and internal gear, and valve means for manual control of the hydraulic retarding means.

8. The combination with an epicyclic gearset having gear members rotating in opposite directions and a casing for the gear members having an oil chamber and integral cylinders, of a clutch shaft mounted in the casing and extending through the oil chamber, clutch members slidable on the clutch shaft and in engagement with gear members rotating in opposite directions, means for throwing the clutch members into engagement to operate the clutch shaft, pistons working in the cylinders and operatively connected to the clutch shaft, ports connecting the cylinders in pairs, whereby the oil is pumped from one cylinder to the complementary cylinder during the operative movement of the clutch shaft, and manually controlled valves governing said ports.

9. In an epicyclic gearset, a power-shaft, an axially alined driven shaft, a disk integral with the driven shaft, a gear pinion integral with the power shaft, pinion studs on the disk, loose pinions mounted on the pinion studs and having two integral gears, the first integral gear being in mesh with the power-shaft pinion, a sleeve loosely mounted on the power-shaft and adapted for independent rotation, a gear integral with the sleeve and in mesh with the second gear on the loose pinions, an internal gear member in mesh with said second gear on the loose pinions, an external gear integral with the internal gear, a casing for the gearset, a crank and countershaft rotatively mounted in the casing, a clutch pinion mounted on the countershaft and in engagement with the external gear, a second gear member on the rotary sleeve, an idler gear in mesh with the second gear on said sleeve, a clutch pinion mounted on the countershaft and in mesh with the idler gear, said clutch pinions rotating in the same direction, a sliding clutch member mounted on the countershaft and adapted to engage with the clutch pinions and transmit motion to the shaft, an oil chamber in the casing having integral cylinders, pistons working in the cylinders, ports of communication between adjoining complementary cylinders whereby oil is pumped alternately from one cylinder to the complementary cylinder, and manually controlled valve means for closing said ports whereby the motion of the internal gear member and the independent sleeve member is arrested and effectively retarded to vary the speed transmission from the maximum to zero from the power-shaft to the driven shaft.

10. The combination with a epicyclic gearset adapted to transmit motion from a power-shaft to a driven shaft and having gears effective for transmission when the motion thereof is arrested, of a clutch shaft, clutch pinions thereon in mesh with said gears, a clutch member sliding on the clutch shaft and adapted to engage with either clutch pinion, hydraulic braking means for arresting motion of the shaft carrying the clutch, and controlling means for the braking means.

In testimony whereof, I hereunto affix my signature.

JICHIO TOMODA.